(12) United States Patent
Grippo et al.

(10) Patent No.: US 7,121,717 B2
(45) Date of Patent: Oct. 17, 2006

(54) CERAMIC ELEMENT FOR A WATCH CASE AND PROCESS FOR MANUFACTURING THIS ELEMENT

(75) Inventors: Eric Grippo, Geneva (CH); William Passaquin, Armoy (FR)

(73) Assignee: Rolex S. A., Geneve 24 (CH)

( * ) Notice: Subject to any disclaimer, the term of this patent is extended or adjusted under 35 U.S.C. 154(b) by 167 days.

(21) Appl. No.: 11/011,926

(22) Filed: Dec. 14, 2004

(65) Prior Publication Data

US 2005/0136284 A1  Jun. 23, 2005

(30) Foreign Application Priority Data

Dec. 23, 2003  (EP) .................. 03405923

(51) Int. Cl.
- G04B 37/00 (2006.01)
- B32B 3/00 (2006.01)
- B32B 7/00 (2006.01)

(52) U.S. Cl. .............. 368/280; 427/404; 428/209; 428/210; 428/457; 428/472

(58) Field of Classification Search ........ 428/209–210, 428/457, 469, 472, 195.1; 427/404; 368/280, 368/285

See application file for complete search history.

(56) References Cited

U.S. PATENT DOCUMENTS 4,561,783 A * 12/1985 Lederrey .................. 368/309
4,886,766 A * 12/1989 Dwivedi ...................... 501/87
5,058,799 A * 10/1991 Zsamboky ............... 228/124.1
5,082,700 A *  1/1992 Dwivedi ..................... 428/34.4
5,100,714 A *  3/1992 Zsamboky .................. 428/137
5,912,064 A *  6/1999 Azuma et al. .............. 428/141
6,502,982 B1*  1/2003 Bach et al. ................. 368/280
6,655,832 B1* 12/2003 Bach et al. ................. 368/282
6,746,148 B1*  6/2004 Bach et al. ................. 368/280
2003/0043698 A1*  3/2003 Guerry et al. .............. 368/282

FOREIGN PATENT DOCUMENTS

| | | |
|---|---|---|
| CH | 322541 | 6/1957 |
| DE | 2533524 | 7/1975 |
| EP | 0230853 | 8/1987 |
| EP | 0947490 | 10/1999 |
| EP | 0850900 | 10/2001 |
| JP | 09-228050 | 9/1997 |

* cited by examiner

Primary Examiner—Vit W. Miska
(74) Attorney, Agent, or Firm—Sturm & Fix LLP

(57) ABSTRACT

This ceramic element, the visible surface of which includes features, is intended to be fitted onto a watch case. This visible surface has, at each feature, a hollow having the shape of said feature, with a depth at least equal to 0.05 mm, the side walls of said hollow being essentially perpendicular to said visible surface, the bottom of said hollows having a first tie layer of Ti, Ta, Cr or Th type, with a thickness of at least 100 nm and at least a second layer from the group Au, Ag, CrN, Ni, Pt, TiN, ZrN, Pd or alloys thereof with a thickness of at least 100 nm.

18 Claims, 2 Drawing Sheets

US 7,121,717 B2

CERAMIC ELEMENT FOR A WATCH CASE AND PROCESS FOR MANUFACTURING THIS ELEMENT

CROSS REFERENCE TO RELATED APPLICATIONS

This application is claims priority of European Application No. 03405923.8 filed Dec. 23, 2003, which is included in its entirety by reference made hereto.

BACKGROUND OF THE INVENTION

1. Field of the Invention

The present invention relates to a ceramic element intended to be fitted onto a watch case, the visible surface of which includes features, and to a process for manufacturing this element.

2. Description of Related Art

There are many annular elements of flattened cross section, preferably with a frustoconical upper face, provided with graduations or with decorations, that are mounted by clip-fastening onto the middle or onto the bezel of the watch case, especially onto a rotary bezel. These elements have both a technical role, for indicating time, and a decorative role and are often made in alloys easy to be decorated, such as aluminum, which make it possible to obtain various colors and types of features using coating or surface treatment techniques, such as anodizing. This provides great flexibility in the choice of colors and features, thanks to the application of several layers of different colors combined with masking techniques.

The drawback of such elements, when exposed to external attack, like the watch case itself, lies in the fact that they are made of a relatively soft material liable to be scratched. Furthermore, this material may form, with certain metals such as gold, a cell effect and cause corrosion problems.

Raised features are produced by stamping, which makes it difficult to obtain color contrast and material contrast and also to produce taperless graduations, whereas these are however crucial elements from the esthetic standpoint.

It has already been proposed, especially by EP 0 850 900, by EP 0 947 490 and by JP 09-228050, watch case elements made of ceramic. The features or decorations are then obtained by depositing thin hard layers that bond sufficiently to the substrate. These techniques require having to produce hard nonmetallic layers that have colors not exactly identical to the other components of the watch made of precious metals.

Hollows have already been provided on flat or frustoconical disks or rings of ceramic bezels using a laser, especially to form features. The depth of such hollows is limited to 0.05 mm. It must be less than 0.05 mm for fear of weakening the part and no longer being able to clip-fasten it without the risk of breakage. Consequently, the hollows obtained by laser machining are not deep enough to be able to braze features therein without a brazing bead being proud of these hollows. The side walls of the hollows obtained by laser machining are not perpendicular to the surface in which they are made, but inclined toward the centre of the hollow. In addition, this method of machining causes fracture initiators in the disk or the flat ring, in such a way that it can no longer be clip-fastened because of its brittleness, but has to be adhesively bonded and therefore cannot be fastened in a removable manner. Consequently, it is not interchangeable.

Another problem stems from the fact that flat ceramic bezel rings are generally of frustoconical shape. Consequently, it is not possible, using the technique of injection-molding ceramic parts, to produce hollows whose sidewalls are perpendicular to the visible frustoconical surface, given that they would no longer be able to be demolded.

Moreover, it has been proposed in CH 322 541 to protect decorative metal elements that are seen by looking through a sapphire, for example. The alloys employed may therefore be of the same type as those of other parts of the watch. These decorative elements seen through a transparent material have, however, a different appearance from that which would be obtained with features present on the surface. In addition, the use of a transparent ceramic, such as sapphire, is not very favorable for mounting by clip-fastening on account of the high rigidity of this material.

A method has already been proposed, in DE 2 533 524 and in EP 0 230 853, for depositing a metalized layer on a ceramic substrate, which method consists in vacuum-depositing a CuO or Ti reactive first layer at least 100 nm in thickness followed by a vacuum-deposited copper, silver, gold or nickel second layer with a thickness of at least 100 nm, thickened by a chemical or electrochemical plating up to a thickness of 0.004 to 0.020 mm. Adhesion between the two layers is obtained by passage through a furnace. In the case of copper and CuO, the temperature of the furnace must lie between the CuO eutectic point and the melting point of copper, i.e. between 1068° and 1078° C. After this treatment, the deposited layer is ready for the brazing.

Such a process is thus relatively complex in so far as it requires vacuum deposition, chemical or electrochemical deposition and heat treatment operations, before the brazing operation. It also requires heating to a high temperature in order to obtain adhesion between the two layers.

The object of the present invention is to remedy, at least partly, the abovementioned drawbacks.

BRIEF DESCRIPTION OF THE DRAWINGS

For this purpose, the subject of the present invention is firstly a ceramic element intended to be fitted onto a watch case, the visible surface of which has features, as claimed in claim 1. The subject of the invention is also a process for manufacturing a ceramic element as claimed in claim 9.

The ceramic element forming the subject of the present invention offers several possibilities, generally unprecedented on rings preferably intended to be fitted by snap-fastening onto rotary bezels. Thus, thanks to this invention, the features may appear as hollows relative to the visible surface of this ceramic element. However, these features may be formed by features that are raised relative to this visible surface. These features can be brazed without brazing beads appearing around their bases, the latter being hidden by the hollows made at a sufficient depth beneath the visible surface.

Thanks to the process according to the invention, the hollows intended to receive the features may be produced at the desired depth, even if the surface in which they are made is conical or pyramidal, which is generally the case.

The vacuum-deposition process using magnetron sputtering allows excellent bonding of the deposited layers to be obtained. Given that the first, tie layer is highly reactive, the deposition of the second layer, consisting of material from the group Au, Ag, CrN, Ni, Pt, TiN, ZrN, Pd, or alloys thereof, within the same chamber and without returning to atmosphere, ensures that it is protected. It should be noted that magnetron sputtering also makes it possible to work at low temperature, very much below 100° C., in such a way that it would be possible to deposit a mask made of a photosensitive polymer before the vacuum coating operation. However, owing to the presence of the hollows, it will be preferable for a deposition to be carried out over the entire visible face of the frustoconical ring and to subsequently remove the layer from the frustoconical surface by abrasion in order to leave the deposited layers only in the hollows.

Other properties and advantages of the present invention will become apparent over the course of the description that follows, which will be given with the aid of the appended drawings that illustrate, schematically and by way of example, one method of implementing the process forming the subject of the present invention and one variant of said process.

FIGS. 1 to 5 illustrate the various steps of the process for manufacturing a ceramic element, forming one subject of the present invention, seen in cross section and intended to be fitted onto a watch case.

Figure 4:
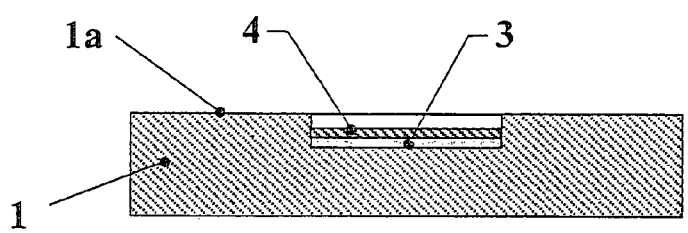
Figure 5:
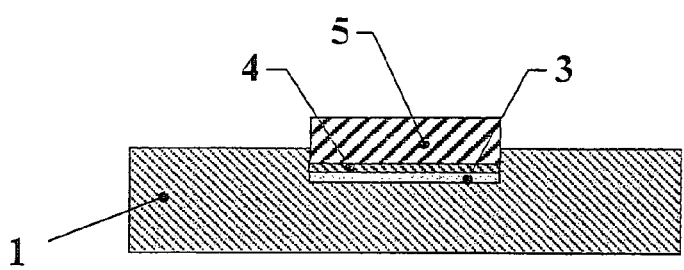
Figure 6:
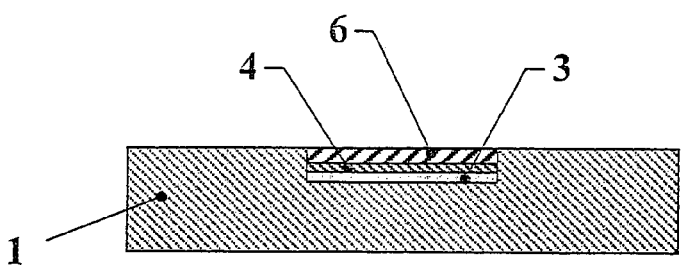

FIG. 6 illustrates a variant of the method of implementation shown in FIGS. 1 to 5.

Figure 7:
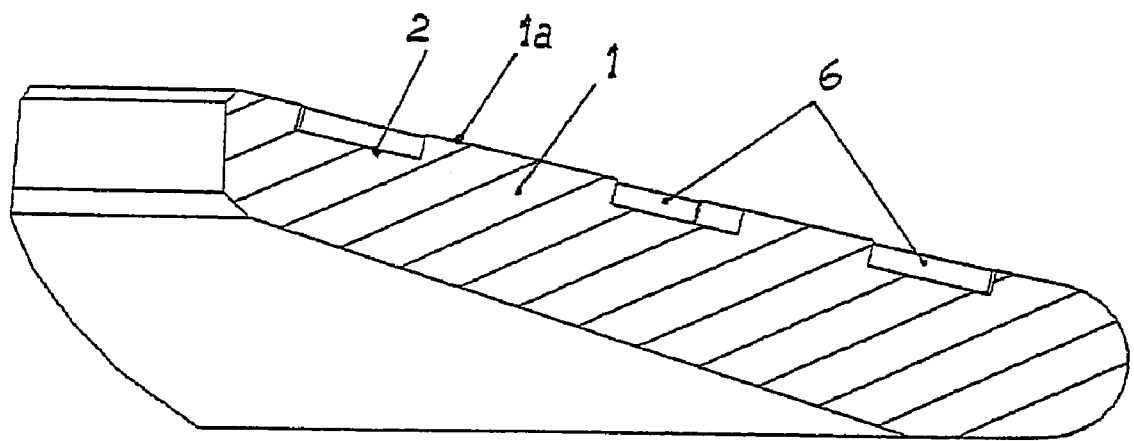

FIG. 7 is a partial view of a diametral cross section of a ceramic ring for a watch bezel according to the present invention.

Figure 8:
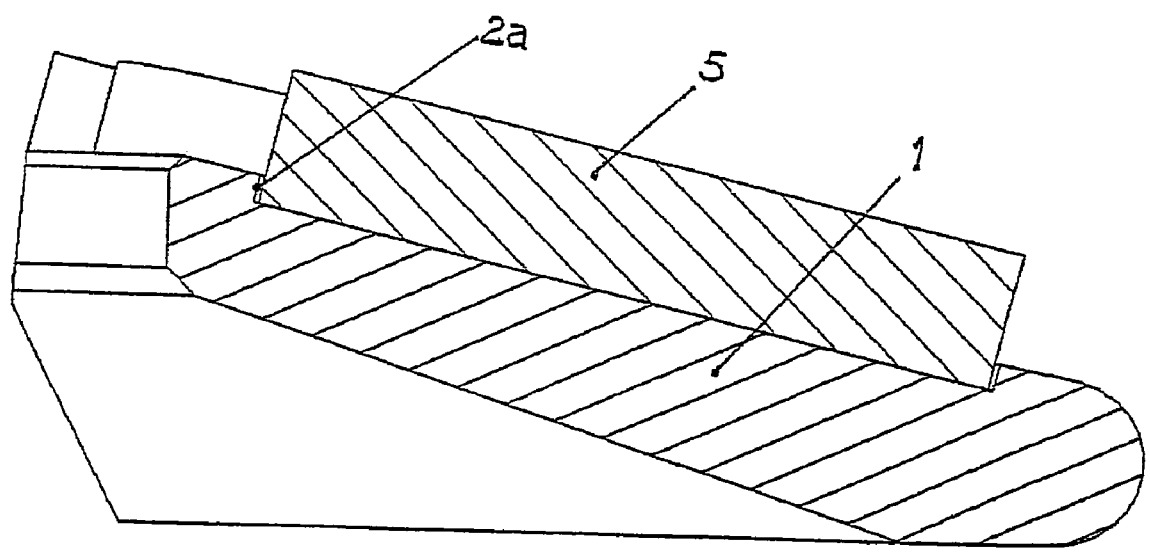

FIG. 8 is a partial view of a diametral cross section of another embodiment of FIG. 7.

Figure 1:
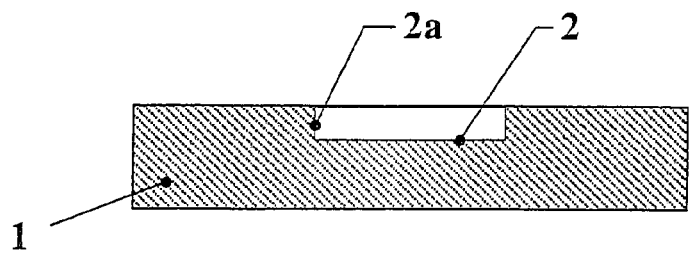
Figure 2:
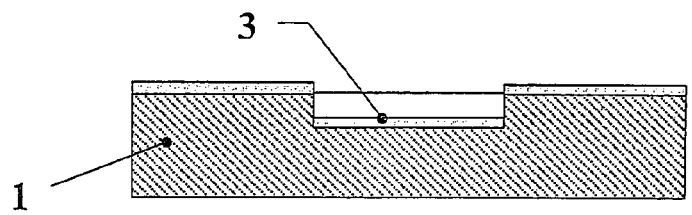

FIG. 1 illustrates a sintered substrate 1 made of $ZrO_2$, $Al_2O_3$ or a mixture of the two, in which a hollow 2 has been made by a mechanical operation of removing material before the substrate is sintered. Such an operation makes it possible to obtain a hollow 2, the sidewalls 2a of which are essentially perpendicular to the visible surface 1a of the substrate 1.

After sintering, this substrate is placed in a vacuum deposition chamber in which a first layer called the tie layer 3 is deposited by the technique of VD (physical vapor deposition) with magnetron sputtering, which makes it possible to ensure greater adhesion of the tie layer 3 than would be obtained using the PVD technique without a magnetron. Furthermore, thanks to the magnetron sputtering, the temperature of the substrate 1 may be kept low, well below 100° C., during the deposition operation.

While still maintaining a vacuum in the deposition chamber, a second layer 4 is formed by magnetron sputtering using a target of the Au, Ag, Pt, Pd, TiN, CrN or Ni type. The thickness of this second layer is at least 500 nm and preferably between 500 nm and 15 µm.

Following the deposition of this second layer 4, the substrate is removed from the deposition chamber and the visible surface 1a of the layers 3 and 4 is abrasively stripped off (by polishing or diamond grinding) in order to bare the ceramic of the substrate 1 and to give it the desired surface finish, in such a way that the deposited layers 3 and 4 now remain only within the hollows 2.

The final operation then consists in depositing some brazing paste in the bottom of the hollow 2 and in brazing a feature 5 therein, the shape and the dimensions of the base of said feature corresponding to those of the hollow 2 (FIG. 5). The hollow is sufficiently deep for the brazing bead, after this feature has been fixed, to remain within the hollow 2 and not be visible. In practice, to achieve this result, the minimum depth of the hollow 2, before deposition of the adhesion layers, is 0.08 mm. The maximum depth depends essentially on the thickness of the substrate 1—the thicker the substrate the deeper the hollow may be. However, it is not in general necessary to exceed a depth of 0.20 mm.

In a variant of this process, illustrated by FIG. 6, after the second layer 4 has been deposited the operation illustrated by FIG. 6 is carried out, which consists in filling the hollow 2 with a noble metal or with a noble metal alloy 6 by electroforming, followed by a polishing operation, which removes the layers 3, 4 and 6 from the surface 1a of the substrate 1.

The equipment used to carry out the vacuum deposition by magnetron sputtering comprises:
 a cylindrical stainless steel chamber with a turbomolecular pumping system and a rotary vane pump;
 a substrate holder of the carousel type having a vertical rotation axis and vertically positioned substrates, and the possibility of carrying out biased RF sputtering on the substrate holder;
 two vertical rectangular magnetron cathodes mounted so as to face the carousel at an angle of 120° relative to the axis of the carousel;
 two cathodes, namely a $Ti_{99.99}$ target and an $Au_{99.99}$ target;
 a supply for the cathodes, by means of an RF (13.56 MHz) 600 W generator with a manual impedance-matching box;
 a gas feed (purity: 5.7–6.0) via a mass flowmeter; and
 pressure monitoring by a Penning gauge, for monitoring the limiting vacuum and by a capacitive gauge (absolute measurement) for monitoring the working pressure.

The parts are cleaned in an ultrasonic bath with a 20% isopropyl alcohol/80% deionized water mixture for five minutes and then dried with a nitrogen gun.

The substrates are stripped by placing the chamber under vacuum, pumping down to a pressure of less than $5 \times 10^{-2}$ Pa. An ion cleaning operation is carried out on the surface of the substrates by reverse sputtering:
 RF power on the substrate holder: >100 W;
 argon flow rate: >15 $cm^3$/min;
 oxygen flow rate: >5 $cm^3$/min;
 total pressure: <5 Pa; and
 duration: 20–30 minutes.

The titanium sublayer deposition conditions are the following:
 RF power on the cathode: >150 W;
 argon flow rate: >5 $cm^3$/min;
 argon pressure: <5 Pa; and
 thickness of the layer: >100 nm, preferably >100 nm and <1500 nm.

While still maintaining vacuum in the chamber, the substrates are moved, by rotation of the carousel, toward a small cathode equipped with the $Au_{99.99}$ target. The deposition conditions are the following:
 RF power on the cathode: >50 W;
 argon flow rate: >10 $cm^3$/min;
 argon pressure: <5 Pa; and
 thickness of the layer: at least >100 nm, preferably >100 nm and <15 µm.

Figure 3:
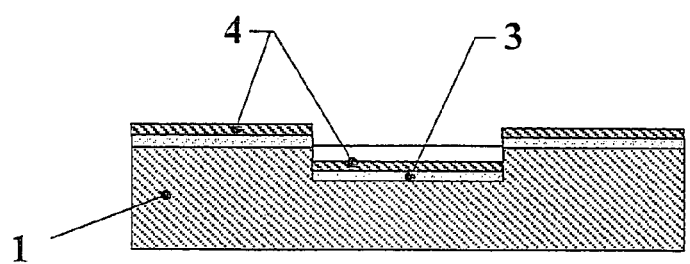

The substrates thus obtained are entirely coated with the titanium tie layer 3, which is itself coated with the gold layer 4, as illustrated by FIG. 3.

In order for the layers deposited to remain only in the hollows, the surface 1a of the substrate 1 is subjected to a mechanical operation of material removal, for example by polishing or diamond grinding with a standard lapidary, in order to obtain a substrate 1 as illustrated by FIG. 4.

According to the first method of implementation, gold features having a shape and dimensions corresponding to those of the hollows 2 in the substrate 1 are brazed. Although the substrate illustrated has only one hollow, it is quite obvious that it preferably has in fact several hollows.

Brazing paste, composed of a gold alloy (Au/Sn), is deposited in the bottom of the hollows 2 using a syringe. The various features are positioned in the hollows of corresponding shapes, and they are then brazed by passing the assembly through a standard belt furnace in a controlled hydrogen atmosphere.

The rate at which the substrates pass through the furnace is greater than 10 cm/min. The temperature of the furnace is 400° C. Then, after polishing, a ceramic element with raised features that have been brazed onto it is obtained, as illustrated in FIG. 5.

According to a first variant illustrated by FIG. 6, it is also possible to fill the hollows with gold or with another metal or noble metal alloy by the electroforming technique. The gold bath used in this case has a high Au content and allows electroforming with a few tenths of a millimetre in thickness. The operating conditions of the electroforming process are those indicated by the suppliers of electroforming baths.

After the deposition carried out by electroforming, the substrates undergo a polishing or diamond grinding operation with a standard lapidary so as to remove the surplus material and obtain a disk with gold-filled hollows and a polished surface flush with the visible surface 1a of the ceramic element 1, as illustrated by FIG. 6.

According to another variant, the symbols or decorations may lie below the level of the surface 1a of the substrate. In this case, they could then be formed directly by the second layer 3, as illustrated by FIG. 4, formed from one of the abovementioned coating elements used for this second layer 3. In this case, the surface finish of the feature at the bottom of the hollow is that of the coating deposited, that is to say a matt finish.

In the examples illustrated, the substrate 1 shown in cross section by FIGS. 1 to 6 corresponds in fact to one portion of the ceramic element forming one subject of the present invention. This portion may correspond in particular to a radial section of this ceramic element, consisting of a circular ring of flattened cross section. Preferably, this ring has a frustoconical shape so that the visible surface 1a is inclined relative to the axis of revolution of this ring.

As a variant, instead of being in the form of a frustoconical ring, the ceramic element forming one subject of the present invention could be in the form of a polygonal frame with faces that are inclined relative to the central axis of this element and thus constitute a truncated pyramid.

FIG. 7 illustrates a portion of a frustoconical ceramic ring 1 intended to be fitted, by elastic deformation, onto a watch case bezel (not shown), in which the hollow or hollows 2 are completely filled, as illustrated by FIG. 6, or partially filled, as in the embodiment shown in FIG. 4.

FIG. 8 illustrates a portion of a frustoconical ceramic ring 1 intended to be fitted, by elastic deformation, onto a watch case bezel (not shown), which includes raised features 5, as in the embodiment shown in FIG. 5.

What is claimed is:

1. Apparatus comprising a ceramic element intended to be fitted onto a watch case, the visible surface of which includes features, wherein said visible surface has, at each feature, a hollow having the shape of the base of said feature, with a depth of at least 0.05 mm, the side walls of the hollow being essentially perpendicular to said visible surface, the bottom of said hollows having a first tie layer at least 100 nm in thickness and at least one second layer from the group Au, Ag, CrN, Ni, Pt, TiN, ZrN, Pd or alloys thereof, with a thickness of at least 100 nm.

2. The ceramic element as claimed in claim 1, the shape of which is circular with the face forming said visible surface of frustoconical shape.

3. The ceramic element as claimed in claim 1, the shape of which is that of a polygonal frame, with the face forming said visible surface having the shape of a truncated pyramid.

4. The ceramic element as claimed in claim 1, in which said features are fitted onto the second of said layers by brazing and the respective bases of said features correspond to the shape of said respective hollows, their heights being greater than the depths of said hollows.

5. The ceramic element as claimed in claim 2, in which said features are fitted onto the second of said layers by brazing and the respective bases of said features correspond to the shape of said respective hollows, their heights being greater than the depths of said hollows.

6. The ceramic element as claimed in claim 3, in which said features are fitted onto the second of said layers by brazing and the respective bases of said features correspond to the shape of said respective hollows, their heights being greater than the depths of said hollows.

7. The ceramic element as claimed in claim 1, in which said features are formed by said second layer.

8. The ceramic element as claimed in claim 2, in which said features are formed by said second layer.

9. The ceramic element as claimed in claim 3, in which said features are formed by said second layer.

10. The ceramic element as claimed in claim 7, in which the surface of said features lies below said visible surface.

11. The ceramic element as claimed in claim 1, in which said ceramic is $ZrO_2$, $Al_2O_3$ or a mixture of the two.

12. The ceramic element as claimed in claims 1, which has the shape of a ring of essentially rectangular radial cross section, intended to be removably fitted onto a bezel by elastic deformation.

13. The ceramic element as claimed in one of the preceding claim 1, in which said first, tie layer is of Ti, Ta, Cr or Th type.

14. A process for manufacturing a ceramic element comprising intended to be fitted onto a watch case, the visible surface of which includes features, wherein said visible surface has, at each feature, a hollow having the shape of the base of said feature, with a depth of at least 0.05 mm, the side walls of the hollow being essentially perpendicular to said visible surface, the bottom of said hollows having a first tie layer at least 100 nm in thickness and at least one second layer from the group Au, Ag, CrN, Ni, Pt, TiN, ZrN, Pd or alloys thereof, with a thickness of at least 100 nm., wherein said hollows are produced by an operation of mechanically removing material, before said ceramic element is sintered, said first layer of Ti, Ta, Cr or Th type is vacuum deposited, after sintering, by a physical vapor deposition (PVD) operation with magnetron sputtering followed, without venting to atmosphere, by PVD deposition of said Au, Pt, Ag, Cr, Pd, TiN, CrN, ZrN or Ni second layer.

15. The process as claimed in claim 14, in which the entire visible face of said ceramic element having said hollows is covered by said layers and then these layers are removed from said visible face by abrasion, in order to leave said layers only in said hollows.

16. The process as claimed in claim 15, in which a third layer, made of Au, Pt, Ag, Cr, Pd or alloys thereof, is deposited by electrodeposition and then said visible surface is subjected to a mechanical operation of material removal until this third layer has been removed from said visible surface.

17. The process as claimed in claim 15, in which some braze is deposited in said hollows and features are brazed in these hollows.

18. The process as claimed in claim 16, in which some braze is deposited in said hollows and features are brazed in these hollows.

* * * * *